US012094389B2

(12) United States Patent
Shen et al.

(10) Patent No.: US 12,094,389 B2
(45) Date of Patent: Sep. 17, 2024

(54) GATE-ON-ARRAY DRIVE CIRCUIT, DISPLAY PANEL, AND DISPLAY DEVICE

(71) Applicant: HKC CORPORATION LIMITED, Guangdong (CN)

(72) Inventors: Tingting Shen, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/924,494

(22) PCT Filed: Dec. 30, 2021

(86) PCT No.: PCT/CN2021/143379
§ 371 (c)(1),
(2) Date: Nov. 10, 2022

(87) PCT Pub. No.: WO2023/040125
PCT Pub. Date: Mar. 23, 2023

(65) Prior Publication Data

US 2024/0221587 A1 Jul. 4, 2024

(30) Foreign Application Priority Data

Sep. 18, 2021 (CN) ......................... 202111096140.X

(51) Int. Cl.
*G09G 3/20* (2006.01)

(52) U.S. Cl.
CPC ... *G09G 3/2092* (2013.01); *G09G 2310/0267* (2013.01); *G09G 2310/062* (2013.01)

(58) Field of Classification Search
CPC ....... G09G 2300/0408; G09G 2300/08; G09G 2310/0248; G09G 2310/0267;
(Continued)

(56) References Cited

U.S. PATENT DOCUMENTS

2011/0058642 A1 3/2011 Tsai et al.
2016/0343332 A1* 11/2016 Cao ...................... G09G 3/3677
(Continued)

FOREIGN PATENT DOCUMENTS

CN 103474040 A 12/2013
CN 104700799 A 6/2015
(Continued)

OTHER PUBLICATIONS

Office Action issued on Dec. 7, 2023, in corresponding Japanese Application No. 2022-573280, 8 pages.
International Search Report issued on Jun. 21, 2022, in corresponding International Application No. PCT/CN2021/143379; 5 pages.

*Primary Examiner* — Insa Sadio
(74) *Attorney, Agent, or Firm* — Maier & Maier, PLLC

(57) ABSTRACT

A gate-on-array (GOA) drive circuit. The GOA drive circuit includes multi-stage cascaded GOA circuits, and each stage of the GOA circuits includes a GOA circuit unit and a signal split circuit that are connected to each other. The signal split circuit is in connection with two adjacent scanning lines. The GOA circuit unit operates in the same mode as the existing GOA circuit unit. The output line scan signal serves as the input signal of the GOA circuit unit at the post-stage as well as the reset signal of the GOA circuit unit at the fore-stage. Moreover, the signal split circuit splits the line scan signal of the current stage into the first sub-line scan signal and the second sub-line scan signal and output the same, thereby realizing the scanning and driving of the two rows of pixel units.

20 Claims, 7 Drawing Sheets

(58) Field of Classification Search
CPC ......... G09G 2310/08; G09G 2330/021; G09G 3/20; G09G 3/2092
See application file for complete search history.

(56) References Cited

U.S. PATENT DOCUMENTS

| | | | |
|---|---|---|---|
| 2017/0193957 | A1 | 7/2017 | Liu et al. |
| 2017/0213497 | A1 | 7/2017 | Shang et al. |
| 2018/0226035 | A1 * | 8/2018 | Wang .................. G09G 3/3696 |
| 2020/0013474 | A1 | 1/2020 | Xu et al. |
| 2020/0035177 | A1 | 1/2020 | Kawachi |
| 2020/0074912 | A1 | 3/2020 | Kitsomboonloha et al. |

FOREIGN PATENT DOCUMENTS

| | | | |
|---|---|---|---|
| CN | 105741808 | A | 7/2016 |
| CN | 106023937 | A | 10/2016 |
| CN | 106898319 | A | 6/2017 |
| CN | 107016971 | A | 8/2017 |
| CN | 110322854 | A | 10/2019 |
| CN | 110390903 | A | 10/2019 |
| CN | 112863447 | A | 5/2021 |
| CN | 113554970 | A | 10/2021 |
| JP | 20133462 | A | 1/2013 |
| WO | 2018193912 | A1 | 10/2018 |

* cited by examiner

GATE-ON-ARRAY DRIVE CIRCUIT, DISPLAY PANEL, AND DISPLAY DEVICE

CROSS-REFERENCE TO THE RELATED APPLICATIONS

This application is the national phase entry of International Application No. PCT/CN2021/143379, filed on Dec. 30, 2021, which is based upon and claims priority to the Chinese Patent Application No. 202111096140.X, filed on Sep. 18, 2021, the entire contents of which are incorporated herein by reference.

FIELD

The present application relates to the field of display panel technology, and more particularly, to a gate-on-array (GOA) drive circuit, a display panel and a display device.

BACKGROUND

With the rapid development of display technology, display panels are widely used in entertainment, education, security and other fields. In the display panel, Gate-On-Array (GOA) technology refers to that the gate driver IC is directly fabricated on the array substrate, and the display panel is enabled to be scanned line by line by outputting line scan signals. The GOA technology is one of the main technologies for realizing a narrow frame of a display panel. On this basis, in order to further narrow the frame of the panel, the number of signals or components of the GOA circuit is usually reduced. Normally, one GOA circuit unit receives a Clock signal and outputs a cycle of the Clock signal as a scan signal of the row of pixels, which undoubtedly increases the size of the frame and is not conducive to narrowing the frame of the display panel.

SUMMARY

An objective of the present application is to realize the narrow frame of the display panel by providing a GOA drive circuit.

In order to solve the above problems, solutions involved in embodiments of the present application are as follows:

In accordance with a first aspect of the embodiments of the present application, a GOA drive circuit is provided, including multi-stage cascaded GOA circuits, each stage of the GOA circuit includes a GOA circuit unit and a signal split circuit that are connected to each other, and each stage of the signal split circuit includes a first signal output end and a second signal output end that are configured for connecting two adjacent scanning lines.

The signal split circuit at each stage is triggered by multiple control signals including a first sub-line scan signal and a second sub-line scan signal output from the signal split circuit at a fore-stage and/or an external control signal, to split line scan signal output from the GOA circuit unit at a current stage into the first sub-line scan signal and the second sub-line scan signal and output the same to the first signal output end, the second signal output end and the signal split circuit at a post-stage.

A rising edge of the first sub-line scan signal output from the signal split circuit at each stage is triggered simultaneously with a rising edge of the line scan signal output from the GOA circuit unit at each stage, and a falling edge of the second sub-line scan signal output from the signal split circuit at each stage is triggered simultaneously with a falling edge of the line scan signal output from the GOA circuit unit at each stage, and high level durations of the first sub-line scan signal and the second sub-line scan signal output from the signal split circuit at each stage are partially overlapped.

Optionally, the external control signal includes a multi-channel clock signal, a frame start signal, a line scan high-level signal, a line scan low-level signal, a first pulse reset signal and a second pulse reset signal.

The first pulse reset signal is input to the signal split circuit at a j-th stage, and the second pulse reset signal is input to the signal split circuit at a (j+1)-th stage, where, $j=1, 3, \ldots, n-1$.

The falling edge of the first sub-line scan signal of the signal split circuit at the j-th stage is triggered simultaneously with the rising edge of the first pulse reset signal, and the falling edge of the first sub-line scan signal of the signal split circuit at the (j+1)-th stage is triggered simultaneously with the rising edge of the second pulse reset signal.

The signal split circuit at a first stage is triggered by the frame start signal, the line scan high-level signal, the line scan low-level signal, the first pulse reset signal and a pull-down signal output from the GOA circuit unit at the first stage, to split the line scan signal of the signal split circuit at the first stage into the first sub-line scan signal and the second sub-line scan signal and output the same.

The signal split circuit at a second stage is triggered by the frame start signal, the line scan high-level signal, the line scan low-level signal, the second pulse reset signal, the pull-down signal output from the GOA circuit unit at the second stage and the first sub-line scan signal output from the signal split circuit at the current stage, to split the line scan signal of the GOA circuit unit at the second stage into the first sub-line scan signal and the second sub-line scan signal and output the same.

The signal split circuit at a i-th stage is triggered by the line scan high-level signal, the line scan low-level signal, a corresponding pulse reset signal, the pull-down signal output from the GOA circuit unit at the i-th stage, the second sub-line scan signal output from the signal split circuit at a (i−2)-th stage, and the first sub-line scan signal output from the signal split circuit at a (i−1)-th stage, to split the line scan signal of the current stage into the first sub-line scan signal and the second sub-line scan signal and output the same, where $i \geq 3$, i is an integer.

Optionally, the GOA circuit unit and the signal split circuit are integrated to be constituted as a GOA chip.

Optionally, the GOA chip includes a clock signal pin for receiving a clock signal, a line scan high-level signal pin for receiving a line scan high-level signal, a line scan low-level signal pin for receiving a line scan low-level signal, a first signal input pin for receiving an input signal, a second signal input pin for receiving the second sub-line scan signal output from the signal split circuit at the fore-stage, a third signal input pin for receiving the first sub-line scan signal output from the signal split circuit at the fore-stage, a fourth signal input pin for receiving the line scan signal output from the GOA chip at the post-stage, a reset pulse signal pin for receiving a corresponding reset pulse signal, a first signal output pin for outputting the line scan signal of the current stage, a second signal output pin for outputting the first sub-line scan signal of the current stage, and a third signal output pin for outputting the second sub-line scan signal of the current stage.

Optionally, the signal split circuit at each stage includes a first switch circuit, a second switch circuit and a pull-down circuit.

A signal output end of the first switch circuit and a first signal end of the pull-down circuit are connected in common to constitute the first signal output end of the signal split circuit. A signal output end of the second switch circuit and a second signal end of the pull-down circuit are connected in common to constitute the second signal output end of the signal split circuit. The first switch circuit and the second switch circuit are further connected with a signal output end of the GOA circuit unit at the current stage respectively. A controlled end of the pull-down circuit is connected to a pull-down point of the GOA circuit unit at the current stage, and configured for inputting a pull-down signal.

The first switch circuit is configured to be turned on and off correspondingly at corresponding timings according to a combination of levels of multiple signals including the corresponding pulse reset signal, the second sub-line scan signal output from the signal split circuit at the fore-stage, the line scan high-level signal, the line scan low-level signal and the frame start signal, to output the first sub-line scan signal of the current stage.

The second switch circuit is configured to be turned on and off correspondingly at corresponding timings according to a combination of levels of multiple signals including the first sub-line scan signal output from the signal split circuit at the fore-stage, the line scan low-level signal and the frame start signal, to output the second sub-line scan signal of the current stage.

The pull-down circuit is configured to be turned on and off correspondingly at corresponding timings according to a combination of levels of the line scan low-level signal and the pull-down signal, to enable the first sub-line scan signal and the second sub-line scan signal to be pulled down and reset.

Optionally, the first switch circuit includes a first signal input end for inputting the second sub-line scan signal output from the signal split circuit at the fore-stage, a second signal input end for inputting the pulse reset signal, a third signal input end for inputting the line scan high-level signal, a fourth signal input end for inputting the line scan low-level signal, and a fifth signal input end configured in connection with a signal output end of the GOA circuit unit at the current stage.

The second switch circuit comprises a first signal input end for inputting the first sub-line scan signal output from the signal split circuit at the fore-stage, a second signal input end for inputting the line scan low-level signal, and a third signal input end configured in connection with a signal output end of the GOA circuit unit at the current stage.

The pull-down circuit comprises a first signal input end for inputting the line scan low-level signal and a second signal input end configured in connection with a pull-down point of the GOA circuit unit of the current stage.

Optionally, the first switch circuit includes a first electronic switch, a second electronic switch, a third electronic switch and a first capacitor.

A first end of the first electronic switch is configured for inputting one of the frame start signal, the second sub-line scan signal output from the signal split circuit at the fore-stage, and the line scan high-level signal. A controlled end of the first electronic switch is configured for inputting the frame start signal or the second sub-line scan signal output from the signal split circuit at the fore-stage. A second end of the first electronic switch, a first end of the second electronic switch, a controlled end of the third electronic switch and a first end of the first capacitor are connected in common. A second end of the second electronic switch is configured for inputting the line scan low-level signal. A controlled end of the second electronic switch is configured for inputting the corresponding pulse reset signal. A first end of the third electronic switch is configured for inputting the line scan signal output from the GOA unit. A second end of the third electronic switch and a second end of the first capacitor are connected in common to constitute the signal output end of the first switch circuit.

Optionally, the second switch circuit includes a fourth electronic switch, a fifth electronic switch, a sixth electronic switch and a second capacitor.

A first end of the fourth electronic switch is configured for inputting the line scan low-level signal. A second end of the fourth electronic switch, a first end of the fifth electronic switch, a controlled end of the six-electronic switch and a first end of the second capacitor are connected in common. A second end of the fifth electronic switch, a controlled end of the fifth electronic switch and a first end of the sixth electronic switch are connected in common and configured for inputting the line scan signal output from the GOA circuit unit at the current stage. A controlled end of the fourth electronic switch is configured for inputting the frame start signal or the first sub-line scan signal output from the signal split circuit at the fore-stage. A second end of the sixth electronic switch and a second end of the second capacitor are connected in common to constitute the signal output end of the second switch circuit.

Optionally, the pull-down circuit includes a seventh electronic switch and an eighth electronic switch. A first end of the seventh electronic switch serves as the first signal end of the pull-down circuit. A first end of the eighth electronic switch serves as the second signal end of the pull-down circuit. A controlled end of the seventh electronic switch and a controlled end of the eighth electronic switch are connected in common and configured for inputting the pull-down signal. A second end of the seventh electronic switch and a second end of the eighth electronic switch are connected in common.

Optionally, the signal split circuit further includes a switch circuit. A first signal input end of the switch circuit, the signal output end of the first switch circuit and the first signal end of the pull-down circuit are connected in common. A second signal input end of the switch circuit, the signal output end of the second switch circuit and the second signal end of the pull-down circuit are connected in common. A third signal input end of the switch circuit is configured for inputting the line scan signal output from the GOA circuit unit at the current stage. A first signal output end and a second signal output end of the switch circuit serve as the first signal output end and the second signal output end of the signal split circuit. A controlled end of the switch circuit is configured for inputting a switch selection signal, the line scan high-level signal and the line scan low-level signal.

The switch circuit is configured to be turned on and off according to high and low levels of the switch selection signal, the line scan high-level signal and the line scan low-level signal, to enable the first sub-line scan signal and the second sub-line scan signal to be switched and output to the first signal output end and the second signal output end of the signal split circuit, or enable the line scan signal output the GOA circuit unit at the current stage to be output to the first signal output end and the second signal output end of the signal split circuit respectively.

Optionally, the third signal input end of the switch circuit is in connection with the first signal output end and the second signal output end when the switch selection signal is at a high level.

The first signal input end of the switch circuit is connected to the first signal output end of the switch circuit, and the second signal input end of the switch circuit is connected to the second signal output end of the switch circuit, when the switch selection signal is at a low level.

Optionally, the switch circuit includes a ninth electronic switch, a tenth electronic switch, an eleventh electronic switch, a twelfth electronic switch, a thirteenth electronic switch, a fourteenth electronic switch, a fifteenth electronic switch and a sixteenth electronic switch.

A first end and a controlled end of the ninth electronic switch are configured for inputting the line scan high-level signal. A first end of the tenth electronic switch is configured for inputting the line scan low-level signal. A second end of the ninth electronic switch, a second end of the tenth electronic switch, and a controlled end of the twelfth electronic switch are connected in common. A first end of the twelfth electronic switch serves as the first signal input end of the switch circuit. A second end of the twelfth electronic switch and a second end of the eleventh electronic switch are connected in common to constitute the first signal output end of the switch circuit. A first end of the eleventh electronic switch and a first end of the fifteenth electronic switch are connected in common to constitute the third signal input end of the switch circuit. A controlled end of the eleventh electronic switch, a controlled end of the tenth electronic switch, a controlled end of the fifteenth electronic switch, and a controlled end of the fourteenth electronic switch are connected in common and configured for inputting the switch selection signal. A first end and a controlled end of the thirteenth electronic switch are configured for inputting the line scan high-level signal. A first end of the fourteenth electronic switch is configured for inputting the line scan low-level signal. A second end of the thirteenth electronic switch, a second end of the fourteenth electronic switch and a controlled end of the sixteenth electronic switch are connected in common. A first end of the sixteenth electronic switch serves as the second signal input end of the switch circuit. A second end of the sixteenth electronic switch and a second end of the fifteenth electronic switch are connected in common to constitute the second signal output end of the switch circuit.

In accordance with a second aspect of the embodiments of the present application, a display panel is provided. The drive device includes an array substrate and the above-mentioned GOA drive circuit. The GOA drive circuit is disposed on one side or two sides of the array substrate.

Optionally, the array substrate includes a display area and a non-display area, and the non-display area is provided with a bonding pin area and the GOA drive circuit, and the GOA drive circuit is arranged on one side or two sides of the non-display area of the array substrate.

In accordance with a third aspect of the embodiments of the present application, a display device is provided, which includes a backlight module, a drive circuit board, and the above-mentioned display panel. The backlight module and the display panel are disposed opposite to each other, and the drive circuit board and the display panel are electrically connected.

In the above-mentioned GOA drive circuit, each stage of the multi-stage cascaded GOA circuits includes a GOA circuit unit and a signal split circuit. The signal split circuit is connected with two adjacent scanning lines in the display panel. The GOA circuit unit operates in the same mode as the existing GOA circuit unit, and the output line scan signal serves as the input signal of the GOA circuit unit at the post-stage and as the reset signal of the GOA circuit unit at the fore-stage. Meanwhile, the signal split circuit splits the line scan signal of the current stage into the first sub-line scan signal and the second sub-line scan signal and output the same, to realize the scanning and driving of the two rows of pixel units, so that the number of devices in the GOA circuit unit is reduced, and thus the size of the frame of the display panel is also reduced, thereby realizing the narrowing of the frame of the display panel.

It should be understood that, for beneficial effects in the second aspect and the third aspect, reference may be made to the relevant descriptions in the first aspect, which will not be repeated here.

BRIEF DESCRIPTION OF THE DRAWINGS

In order to illustrate the solutions in the embodiments of the present application more clearly, the following will briefly introduce the drawings that need to be used in description of the embodiments. Obviously, the drawings in the following description are only some embodiments of the present application. For those of ordinary skill in the art, other drawings can also be obtained according to these drawings without any creative effort.

DETAILED DESCRIPTION

In order to make the objects, solutions and beneficial effects of the present application more comprehensible, the present application will be described in further detail below with reference to the drawings and embodiments. It should be understood that specific embodiments described herein are intended only to interpret the present application, and are not intended to limit the present application.

In addition, the terms "first" and "second" are only used for descriptive purposes, and should not be construed as indicating or implying relative importance or implying the number of indicated technical features. Thus, a feature defined with "first" or "second" may expressly or implicitly include one or more of that feature. In the description of the present application, the phrase "a/the plurality of" means two or more, unless expressly and specifically defined otherwise.

Figure 1:
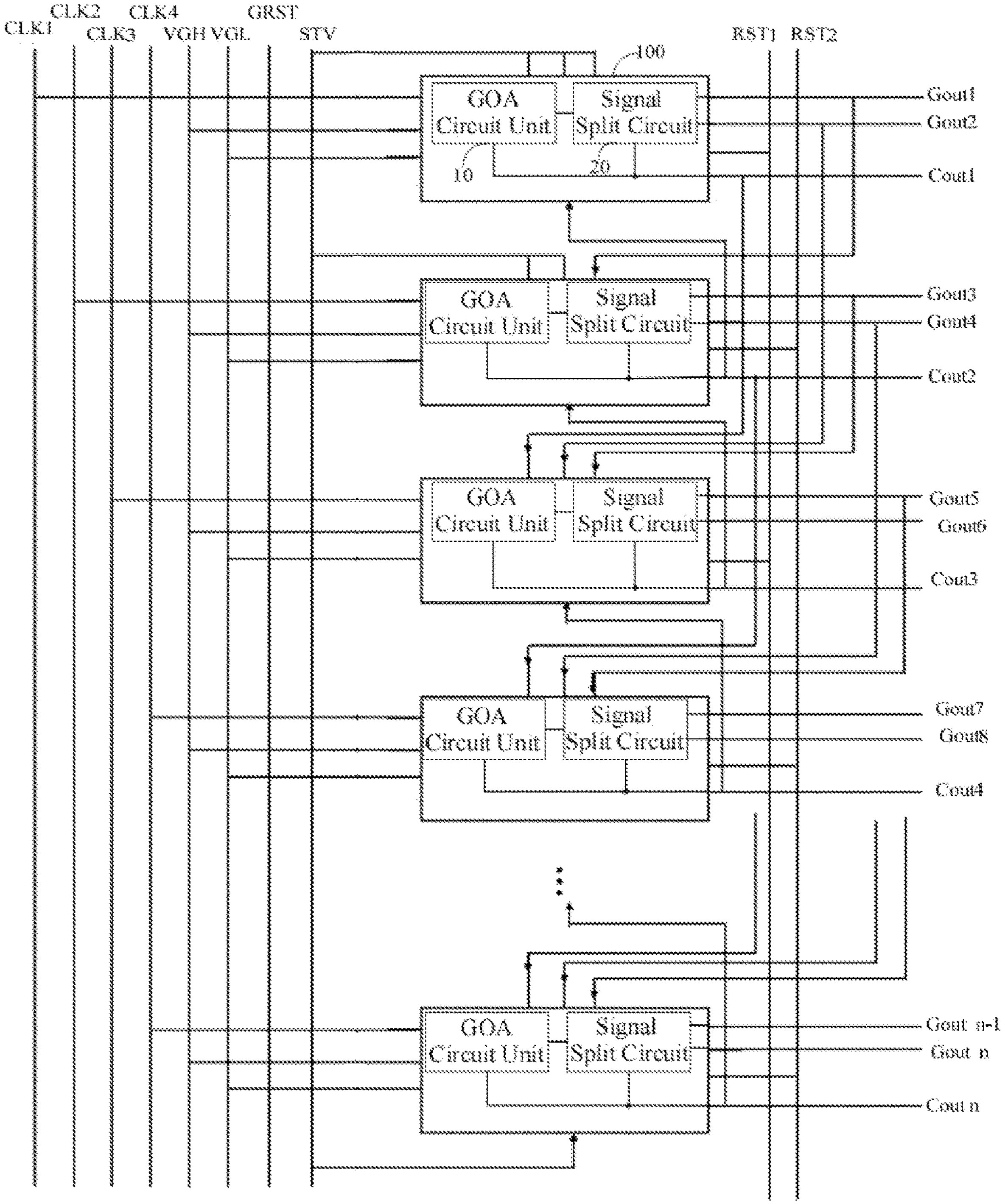
FIG. 1 is a schematic diagram of a first structure of a GOA drive circuit in accordance with an embodiment of the present application.

In accordance with a first aspect of the embodiments of the present application, a GOA drive circuit is provided. As shown in FIG. 1, the GOA drive circuit includes multi-stage cascaded GOA circuits 100, and each stage of the GOA circuits 100 includes a GOA circuit unit 10 and a signal split circuit 20 that are in connection with each other. The signal split circuit 20 at each stage includes a first signal output end and a second signal output end for connecting two adjacent scanning lines.

The signal split circuit 20 at each stage, when being triggered by several control signals including a first sub-line scan signal and a second sub-line scan signal output from the signal split circuit 20 at a fore-stage and/or an external control signal, is configured to split a line scan signal output from the GOA circuit unit 10 at a current stage into the first sub-line scan signal and the second sub-line scan signal and output the same to the first signal output end, the second signal output end and the signal split circuit 20 at a post-stage.

A rising edge of the first sub-line scan signal output from the signal split circuit 20 at each stage is triggered simultaneously with a rising edge of the line scan signal output from the GOA circuit unit 10 at each stage, and. A falling edge of the second sub-line scan signal output from the signal split circuit 20 at each stage is triggered simultaneously with a falling edge of the line scan signal output from the GOA circuit unit 10 at each stage, and high-level duration of the first sub-line scan signal and the second sub-line scan signal output from the signal split circuit 20 at each stage are partially overlapped.

In this embodiment, the GOA circuit 100 is configured to receive an external control signal input by the drive circuit board through a bonding area on an array substrate, and convert the external control signal into a line scan signal. The external control signal includes a multi-channel clock signal, a frame start signal STV, a line scan high-level signal VGH, a line scan low-level signal VGL, a reset signal GRST, etc. The structure and operation mode of the GOA circuit unit 10 are same as the existing GOA circuit unit 10, such as the GOA circuit unit 10 of 4TIC or the GOA circuit unit 10 of 8TIC. The specific driving mode of the GOA drive circuit may be a unilateral driving or a bilateral driving, which will not be limited herein. Meanwhile, the number of clock signals input to the GOA drive circuit may be four channels, or eight channels, etc., depending on the structure and working requirements of the GOA circuit 100 and the internal GOA circuit unit 10, which will not be limited herein.

The GOA circuit unit 10 outputs line scan signals line by line according to the input control signals such as a one-channel clock signal, a frame start signal STV, etc. Meanwhile, the line scan signal output from the current stage serves as a reset signal of the GOA circuit unit 10 at the fore-stage, and an input signal of the GOA circuit unit 10 at the post-stage, the GOA circuit units 10 in different rows have influences to each other, thereby generating a shift pulse signal.

Figure 2:
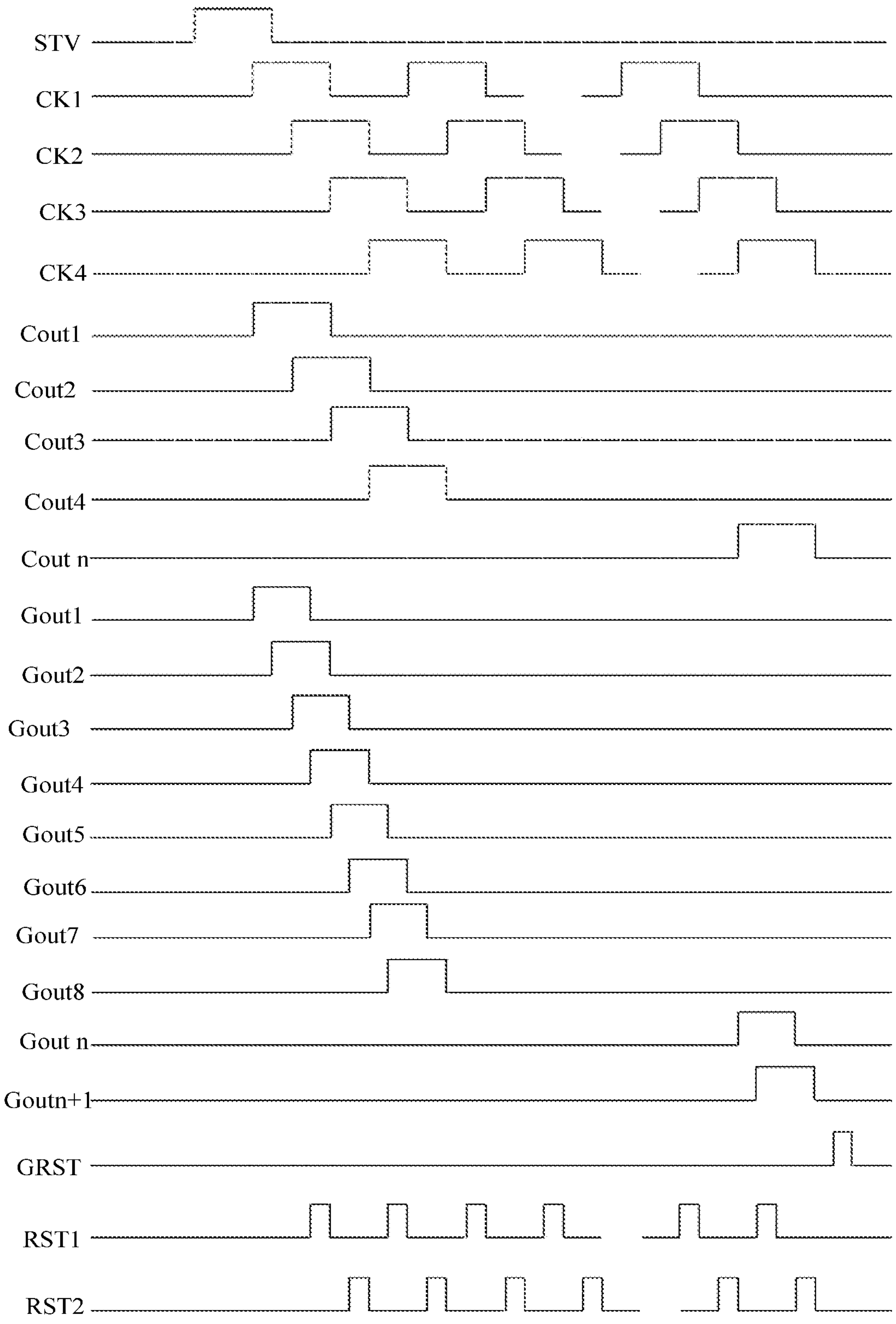
FIG. 2 is a schematic waveform diagram of the GOA drive circuit in accordance with an embodiment of the present application.

Meanwhile, the line scan signal output from the current stage is input to the signal split circuit 20 at the current stage for signal splitting, and is converted and output as two sub-line scan signals. The two sub-line scan signals are output as final line scan signals to drive two rows of pixel units line by line. The two sub-line scan signals respectively serve as the control signals of the signal split circuit 20 at the post-stage and the signal split circuit 20 at a stage after the post-stage, so that the signal split circuits 20 at all stages are correspondingly converted and split to generate the shift pulse signal, thereby driving the corresponding row of the pixel units on the array substrate. As shown in FIG. 2, each GOA circuit unit 10 is configured to output first shift pulse signals Cout 1-Cout n according to the existing working mode, meanwhile, the signal split circuit 20 at each stage is configured to output second shift pulse signals Gout1-Gout n+1 according to several control signals including the received first and second sub-line scan signals output from the signal division circuit 20 at the fore-stage and/or the external control signal. Based on a single one of the existing GOA circuit units 10 drives one row of pixel units, in the present application, one GOA circuit 100 is enabled to drive two rows of pixel units by arranging the signal split circuit 20, under the condition that the number of rows of the array substrate remains unchanged, the number of devices of the GOA circuit unit 10 can be reduced by half, with respect to the existing circuits, and the size of the frame of the display panel can be reduced, and thus the narrowing of the frame of the display panel can be realized.

The signal split circuit 20 is configured to output the shifted first sub-line scan signal and the second sub-line scan signal according to each control signal, and the rising edge of the first sub-line scan signal output from the signal split circuit 20 at each stage is triggered simultaneously with the rising edge of the line scan signal output from the GOA circuit unit 10 at each stage, and the falling edge of the second sub-line scan signal output from the signal split circuit 20 at each stage is triggered simultaneously with the falling edge of the line scan signal output from the GOA circuit unit 10 at each stage. In this way, the first sub-line scan signal and the second sub-line scan signal follow the original line scan signal to be shifted and output synchronously, ensuring normal driving of pixel units in each row and improving driving reliability.

The signal split circuit 20 at different stages may be triggered through different driving control signals to split and output the first sub-line scan signal and the second sub-line scan signal, and the specific driving control signals received by the signal split circuit 20 at different stages are not limited herein.

Meanwhile, the signal split circuit 20 may be split circuits having different switch structures, such as a shift circuit, a sequential circuit, and the like, and the specific structure of the signal split circuit 20 are not limited herein.

Figure 3:
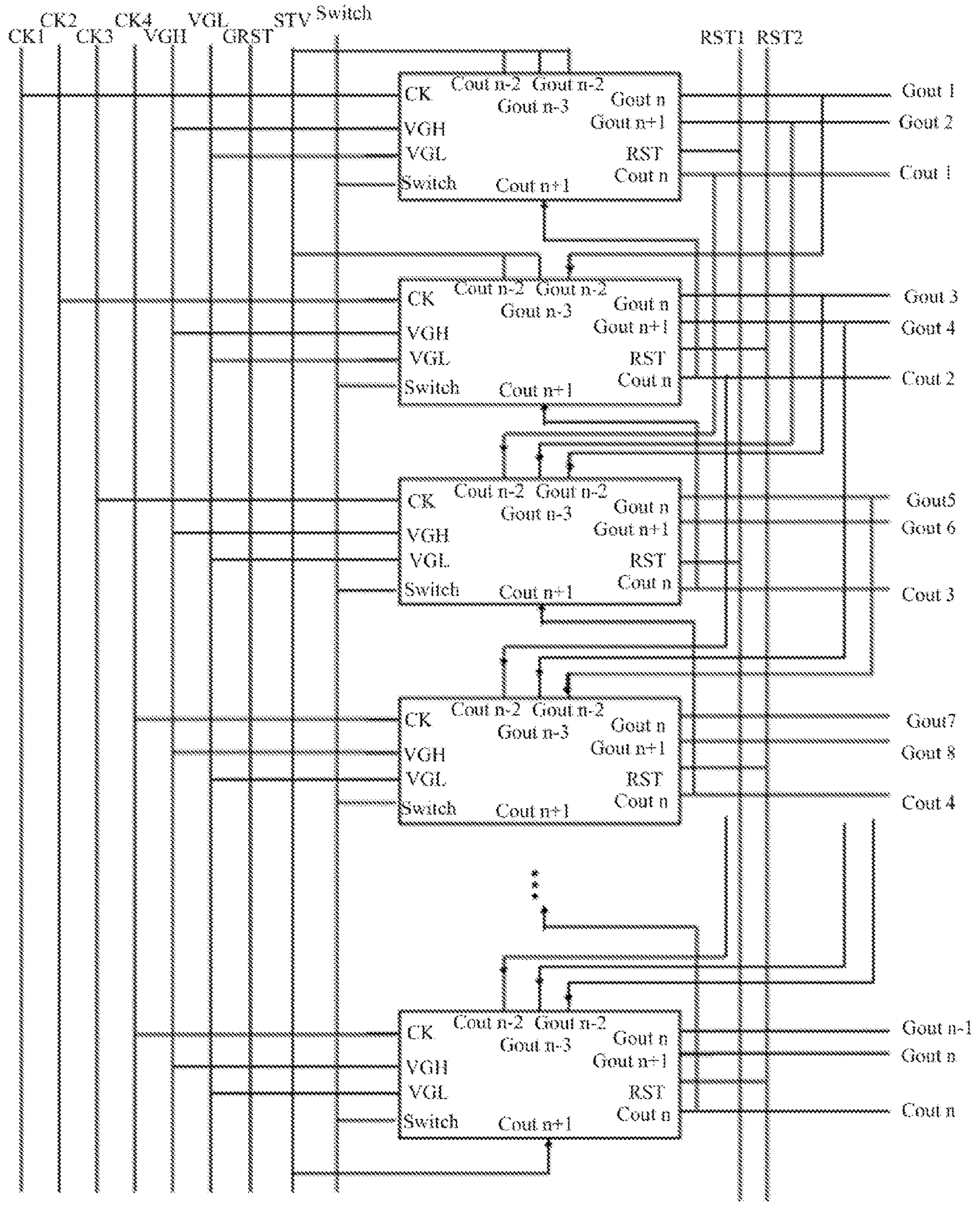
FIG. 3 is a schematic diagram of a second structure of the GOA drive circuit in accordance with an embodiment of the present application.

On the basis of the above GOA drive circuit, further implementations are provided as follows. As shown in FIG. 1 and FIG. 3, in an exemplary embodiment, the external control signal includes a multi-channel clock signal, a frame start signal STV, and a line scan high-level signal VGH, a line scan low-level signal VGL, a first pulse reset signal RST1 and a second pulse reset signal RST2.

The signal split circuit 20 at the j-th stage is configured for inputting the first pulse reset signal RST1, and the signal split circuit 20 at the (j+1)-th stage is configured for inputting the second pulse reset signal RST2, where j=1, 3, . . . , n−1.

The falling edge of the first sub-line scan signal of the signal split circuit 20 at the j-th stage is triggered simultaneously with the rising edge of the first pulse reset signal RST1, and the falling edge of the first sub-line scan signal of the signal split circuit 20 at the j+1-th stage is triggered simultaneously with the rising edge of the second pulse reset signal RST2.

In this embodiment, the external clock signal, the line scan high-level signal VGH, the line scan low-level signal VGL, the frame start signal STV, the first pulse reset signal RST1 and the second pulse reset signal RST2 are input by the drive circuit board through the bonding area of the array substrate, as shown in FIG. 2, the first pulse reset signal RST1 and the second pulse reset signal RST2 are in pulse waveforms, and are respectively configured to realize falling edge controls of the first sub-line scan signals of the signal split circuits 20 at odd-numbered stages and even-numbered stages.

Meanwhile, the driving mode of the signal split circuit 20 at each stage is similar to that of the GOA circuit unit 10 at each stage, that is, the signal split circuit 20 of the GOA circuit 100 at the first stage is triggered after receiving the frame start signal STV, the line scan high-level signal VGH, the line scan low-level signal VGL, the first pulse reset signal RST1 and the pull-down signal QB-n output from the GOA circuit unit 10 at the current stage to generate the first sub-line scan signal and the second sub-line scan signal of the signal split circuit at the first stage. The first sub-line scan signal and the second sub-line scan signal of the signal split circuit at the first stage are input to the first row of pixel units and the second row of pixel units of the array substrate, and meanwhile, the first sub-line scan signal of the signal split circuit at the first stage is input to the signal split circuit 20 at the second stage, and the second sub-line scan signal of the signal split circuit at first stage is input to the signal split circuit 20 at the third stage, serving as the drive control signals of the signal split circuit 20 at the second stage and the signal split circuit 20 at the third stage.

The signal split circuit 20 at the second stage, when being triggered by the frame start signal STV, the line scan high-level signal VGH, the line scan low-level signal VGL, the second pulse reset signal RST2, and the pull-down signal QB-n output from the GOA circuit unit 10 at the current stage and the first sub-line scan signal output from the signal split circuit 20 at the first stage, is configured to split the line scan signal of the current-stage into the first sub-line scan signal and the second sub-line scan signal and output the same. The first sub-line scan signal of the signal split circuit at the second stage is input to the signal split circuit 20 at the third stage, and the second sub-line scan signal of the signal split circuit at the second stage is input to the signal split circuit 20 at the fourth stage, serving as the drive control signals of the signal split circuit 20 at the third stage and the signal split circuit 20 at the fourth stage.

By analogy, the signal split circuit 20 at the i-th stage, when being triggered by the line scan high-level signal VGH, the line scan low-level signal VGL, the corresponding pulse reset signal, the pull-down signal QB-n output from the GOA circuit unit 10 at the current stage, the second sub-line scan signal output from the signal split circuit 20 at the (i−2)-th stage, and the first sub-line scan signal output from the signal split circuit 20 at the (i−1)-th stage, is configured to split and output the line scan signal of the current stage as the first sub-line scan signal and the second sub-line scan signal, where i≥3, i is an integer, until the signal split circuit 20 at the last stage correspondingly outputs the first sub-line scan signal and the second sub-line scan signal, and finally the shift pulse signals Gout1-Gout n+1 are generated to drive the corresponding row of the pixel units.

As shown in FIG. 3, to further improve the stability of the output signal, in one embodiment, the GOA circuit unit 10 is integrated with the signal split circuit 20 to constitute a GOA chip. The GOA chip includes a clock signal pin CK for receiving a clock signal, a line scan high-level signal pin for receiving the line scan high-level signal VGH, a line scan low-level signal pin for receiving the line scan low-level signal VGL, a first signal input pin Cout n−2 for receiving an input signal, a second signal input pin Gout n−3 for receiving the second sub-line scan signal output from the corresponding fore-stage, and a third signal input pin Gout n−2 for receiving the first sub-line scan signal output from the corresponding fore-stage, a fourth signal input pin Cout n+1 for receiving the line scan signal output from the GOA chip at the post-stage, a reset pulse signal pin RST for receiving the corresponding reset pulse signal, a first signal output pin Cout n for outputting the line scan signal of the current stage, a second signal output pin Gout n for outputting the first sub-line scan signal of the current stage, and a third signal output pin Gout n+1 for outputting the second sub-line scan signal of the current stage.

For the GOA chip at the first stage, the frame start signal STV is input through the first signal input pin Cout n−2, the second signal input pin Gout n−3 and the third signal input pin Gout n−2 respectively. The frame start signal STV, serving as the input signal of the GOA circuit unit 10 in the GOA chip at the first stage, is converted and output by the GOA circuit unit 10 as the line scan signal of the GOA circuit unit 10 at the first stage. Meanwhile, the frame start signal STV, the line scan high-level signal VGH, the line scan low-level signal VGL, and the first pulse reset signal RST1, serving as the driving control signals of the signal split circuit 20 in the GOA chip at the first stage, are configured to control on-and-off of the signal split circuit 20, and the line scan signal of the GOA circuit unit 10 at the first stage is split and output as the first sub-line scan signal Gout1 and the second sub-line scan signal Gout2 of the current stage.

For the GOA chip at the second stage, the frame start signal STV is input through the first signal input pin Cout n−2 and the second signal input pin Gout n−3 respectively, and the first sub-line scan signal output from the GOA chip at the first stage is input through the third signal input pin Gout n−2, the frame start signal STV serving as the input signal of the GOA circuit unit 10 in the GOA chip at the second stage, is converted and output by the GOA circuit unit 10 as the line scan signal of the GOA circuit unit at the second stage. Meanwhile, the frame start signal STV, the line scan high-level signal VGH, the line scan low-level signal VGL, the second pulse reset signal RST2, and the first sub-line scan signal output from the GOA chip at the first stage, serving as the driving control signals of the signal split circuit 20 in the GOA chip at the second stage, are configured to control the on-and-off of the signal split circuit 20, and the line scan signal of the GOA circuit unit at the second stage is split and output as the first sub-line scan signal Gout3 and the second sub-line scan signal Gout4 of the current stage.

For the GOA chip at the third and last stage, the line scan signal output from the GOA chip at the (i−2)-th stage is input through the first signal input pin Cout n−2, the second sub-line scan signal output from the GOA chip at the (i−2)-th stage is input through the second signal input pin Gout n−3, and the first sub-line scan signal output from the GOA chip at the (i−1)-th stage is input through the third signal input pin Gout n−2. The line scan signal output from the GOA chip at the (i−2)-th stage, serving as the input signal of the GOA circuit unit 10 in the GOA chip at the current stage, is converted and output by the GOA circuit unit 10 as the line scan signal of the current stage. Meanwhile, the frame start signal STV, the line scan high-level signal VGH, the line scan low-level signal VGL, the corresponding pulse reset signal, the second sub-line scan signal output from the GOA chip at the (i−2)-th stage, and the first sub-line scan signal output from the GOA chip at the (i−1)-stage, serving as the driving control signals of the signal split circuit 20 in the GOA chip at the current stage, are configured to control the on-and-off of the signal split circuit 20, and the line scan signal of the current stage is split and output as the first sub-line scan signal Gout n and the second sub-line scan signal Gout n+1 of the current stage.

Figure 4:
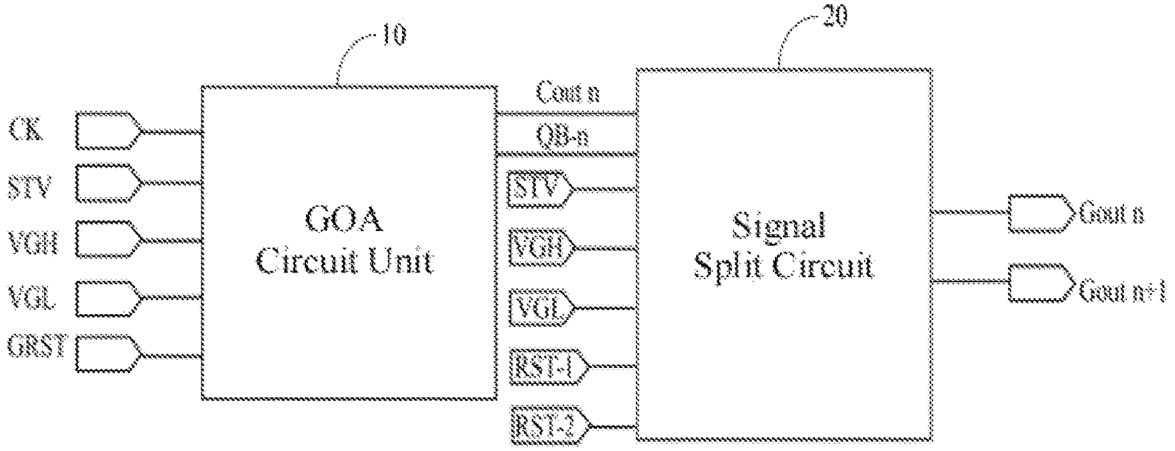
FIG. 4 is a schematic structural diagram of a GOA circuit in the GOA drive circuit shown in FIG. 1.
Figure 5:
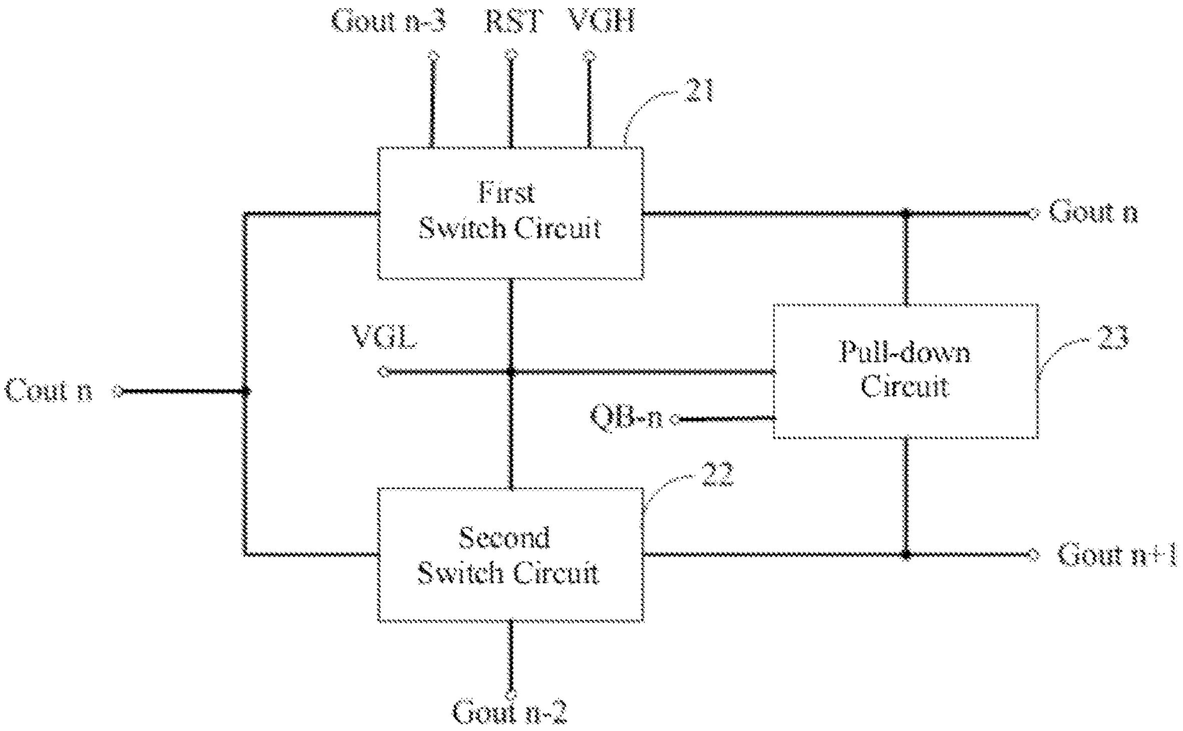
FIG. 5 is a schematic diagram of a first structure of a signal split circuit in the GOA circuit shown in FIG. 4.

On the basis of the above GOA drive circuit, further optimization and implementations are provided as follows. As shown in FIG. 4 and FIG. 5, in an exemplary embodiment, the signal split circuit 20 at each stage includes a first switch circuit 21, a second switch circuit 22 and a pull-down circuit 23.

A signal output end of the first switch circuit 21 and a first signal end of the pull-down circuit 23 are connected in common to constitute the first signal output end of the signal split circuit 20, and a signal output end of the second switch circuit 22 and a second signal end of the pull-down circuit 23 are connected in common to constitute the second signal output end of the signal split circuit 20. The first switch circuit 21 and the second switch circuit 22 are also connected with a signal output end of the GOA circuit unit 10 at the current stage respectively. A controlled end of the pull-down circuit 23 is connected to a pull-down point of the GOA circuit unit 10 at the current stage, and configured for inputting the pull-down signal QB-n.

The first switch circuit 21 is configured to be turned on and off correspondingly at corresponding timings according to a combination of levels of several signals including the corresponding pulse reset signal, the second sub-line scan signal output from the signal split circuit 20 at the fore-stage, the line scan high-level signal VGH, the line scan low-level signal VGL and the frame start signal STV, to output the first sub-line scan signal of the current stage.

The second switch circuit 22 is configured to be turned on and off correspondingly at corresponding timings according to a combination of levels of several signals including the first sub-line scan signal output from the signal split circuit 20 at the fore-stage, the line scan low-level signal VGL and the frame start signal STV, to output the second sub-line scan signal of the current stage.

The pull-down circuit 23 is configured to be turned on and off correspondingly at corresponding timings according to a combination of levels of the line scan low-level signal VGL and the pull-down signal QB-n, to enable the first sub-line scan signal and the second sub-line scan signal to be pulled down and reset.

In this embodiment, the first switch circuit 21 includes a first signal input end for inputting the second sub-line scan signal output from the signal split circuit 20 at the fore-stage, a second signal input end for inputting the pulse reset signal, a third signal input end for inputting the line scan high-level signal VGH, a fourth signal input end for inputting the line scan low-level signal VGL, and a fifth signal input end configured in connection with a signal output end of the GOA circuit unit 10 at the current stage. The second switch circuit 22 includes a first signal input end for inputting the first sub-line scan signal output from the signal split circuit 20 at the fore-stage, and a second signal input end for inputting the line scan low-level signal VGL, and a third signal input end configured in connection with a signal output end of the GOA circuit unit 10 at the current stage. The pull-down circuit 23 includes a first signal input end for inputting the line scan low-level signal VGL and a second signal input end configured in connection with a pull-down point of the GOA circuit unit 10 at the current stage. The pull-down point of the GOA circuit unit 10 at the current stage is a voltage at the pull-down point of the GOA circuit unit 10.

Figure 7:
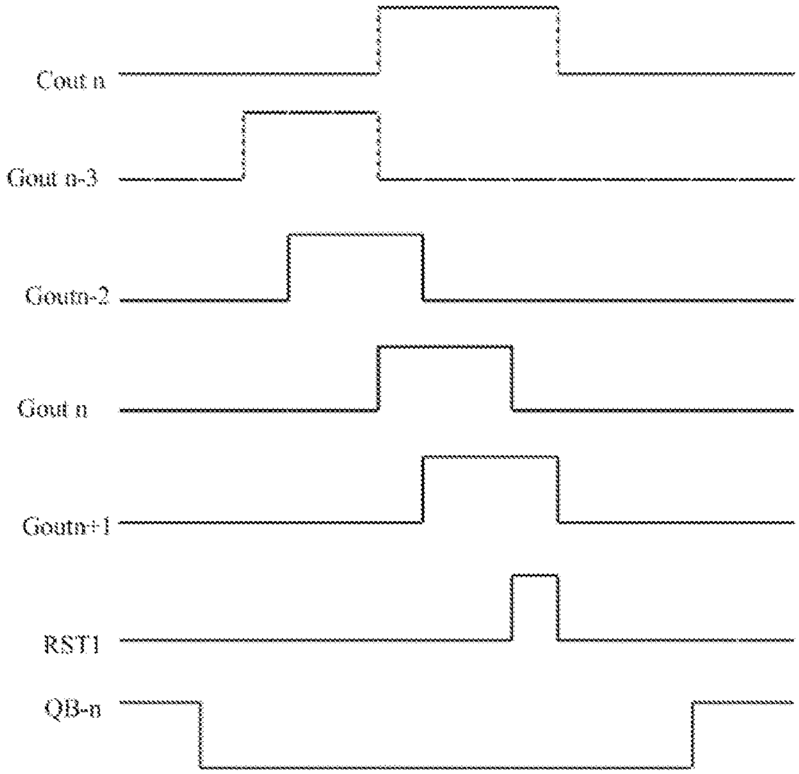
FIG. 7 is a first schematic waveform diagram of the signal split circuit in the GOA circuit shown in FIG. 6.

Specifically, as shown in FIG. 7, when the first signal input end of the first switch circuit 21 is at a high level, the first switch circuit 21 is turned on, and the line scan signal output from the GOA circuit unit 10 at the current stage is output by the first switch circuit 21 at a low level. When the first signal input end of the first switch circuit 21 is turned off, the first switch circuit 21 continues to be turned on due to the coupling of internal capacitance, and the line scan signal output from the GOA circuit unit 10 at the current stage is output by the first switch circuit 21 at a high level. When the second signal input end, i.e., the pulse reset signal, is at a high level, the first switch circuit 21 is turned off, and a low level is output by the first switch circuit 21 as the internal capacitance is coupled to a low level, a first pulse signal representing the first sub-line scan signal is output from the first switch circuit 21, and meanwhile, when the pull-down signal QB-n is at a high level, the pull-down circuit 23 is turned on, a low level is output, and the first sub-line scan signal is pull-down and reset to a low level.

When the first signal input end of the second switch circuit 22 is at a high level, the second switch circuit 22 is turned off, and a low level is output by the second switch circuit 22. When the first signal input end of the second switch circuit 22 is at a low level, the second switch circuit 22 is turned on, and the line scan signal output from the GOA circuit unit 10 at the current stage is output by the second switch circuit 22 at a high level. When the third signal input end of the second switch circuit 22 is at a low level, the second switch circuit 22 is at a low level due to the coupling of the internal capacitance, thereby outputting a second pulse signal representing the second sub-line scan signal, and meanwhile, when the pull-down signal QB-n is at a high level, the pull-down circuit 23 is turned on, a low level is output, the second sub-line scan signal is pulled down and reset to a low level.

By arranging the first switch circuit 21, the second switch circuit 22 and the pull-down circuit 23, the split conversion of the line scan signal is realized, two channels of shifted sub-line scan signals are output, and thus the circuit structure is simple.

The first switch circuit 21, the second switch circuit 22 and the pull-down circuit 23 may be controlled to be turned on and off correspondingly at corresponding timings by corresponding switch structures.

Figure 6:
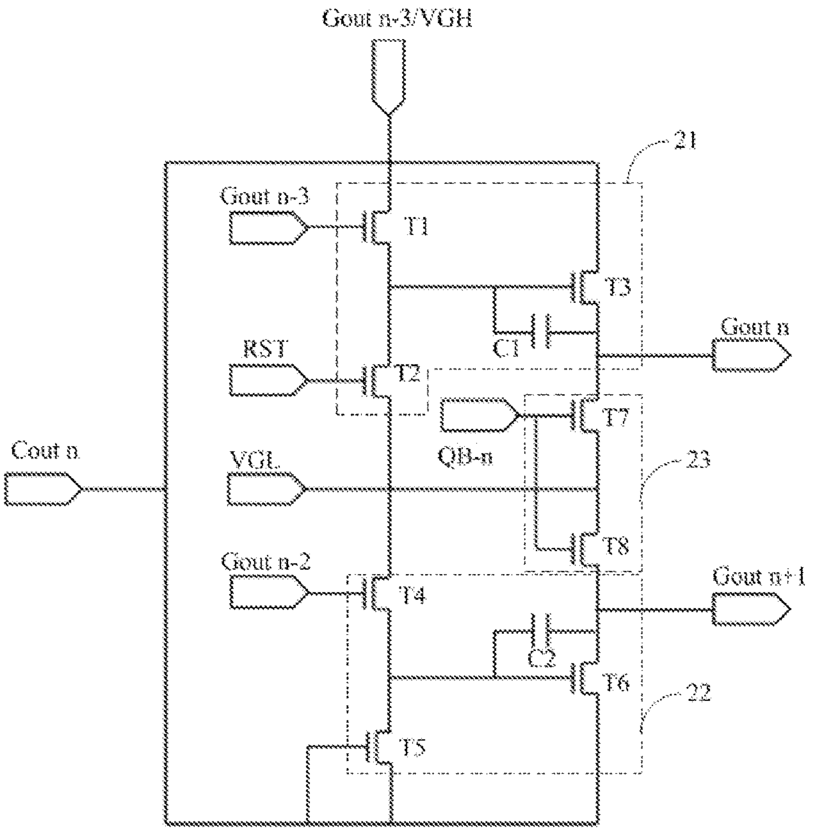
FIG. 6 is a first schematic circuit diagram of the signal split circuit in the GOA circuit shown in FIG. 4.

On the basis of the above signal split circuit 20, further implementations are as follows. As shown in FIG. 6, in an exemplary embodiment, the first switch circuit 21 includes a first electronic switch T1, a second electronic switch T2, a third electronic switch T3 and a first capacitor C1.

A first end of the first electronic switch T1 is configured for inputting one of the frame start signal STV, the second sub-line scan signal output from the signal split circuit 20 at the fore-stage, and the line scan high-level signal VGH. A controlled end of the switch T1 is configured for inputting the frame start signal STV or the second sub-line scan signal output from the signal split circuit 20 at the fore-stage. A second end of the first electronic switch T1, a first end of the second electronic switch T2, a controlled end of the third electronic switch T3 and a first end of the first capacitor C1 are connected in common. A second end of the second electronic switch T2 is configured for inputting the line scan low-level signal VGL, a controlled end of the second electronic switch T2 is configured for inputting the corresponding pulse reset signal, and a first end of the third electronic switch T3 is configured for inputting the line scan signal output from the GOA circuit unit 10 at the current stage. A second end of the third electronic switch T3 and a second end of the first capacitor C1 are connected in common to constitute the signal output end of the first switch circuit 21.

The second switch circuit 22 includes a fourth electronic switch T4, a fifth electronic switch T5, a sixth electronic switch T6 and a second capacitor C2.

A first end of the fourth electronic switch T4 is configured for inputting the line scan low-level signal VGL. A second end of the fourth electronic switch T4, a first end of the fifth electronic switch T5, a controlled end of the sixth electronic switch T6 and a first end of the second capacitor C2 are connected in common. A second end of the fifth electronic switch T5, a controlled end of the fifth electronic switch T5 and a first end of the sixth electronic switch T6 are connected in common and configured for inputting the line scan signal output from the GOA circuit unit 10 at the current stage. A controlled end of the fourth electronic switch T4 is configured for inputting the frame start signal STV or the first sub-line scan signal output from the signal split circuit 20 at the fore-stage. A second end of the sixth electronic switch T6 and a second end of the second capacitor C2 are connected in common to constitute the signal output end of the second switch circuit 22.

The pull-down circuit 23 includes a seventh electronic switch T7 and an eighth electronic switch T8.

A first end of the seventh electronic switch T7 serves as the first signal end of the pull-down circuit 23. A first end of the eighth electronic switch T8 serves as the second signal end of the pull-down circuit 23. A controlled end of the seventh electronic switch T7 and a controlled end of the eighth electronic switch T8 are connected in common and configured for inputting the pull-down signal QB-n. A second end of the seventh electronic switch T7 and a second end of the eighth electronic switch T8 are connected in common.

In this embodiment, as shown in FIG. 7, when the controlled end and the first end of the first electronic switch T1 are at a high level, the first electronic switch T1 is turned on, and a high level is input to the third electronic switch T3, the third electronic switch T3 is turned on, the line scan signal output from the GOA circuit unit 10 at the current stage is output from the second end of the third electronic switch T3 at a low level. When the controlled end of the first electronic switch T1 is at a low level, the third electronic switch T3 is turned off. When the first end of the third electronic switch T3 is at a high level, the third electronic switch T3 continues to turned on due to the coupling of the first capacitor C1 to output the line scan signal output from the GOA circuit unit 10 at the current stage at a high level. When the pulse reset signal is at a high level, the second electronic switch T2 is turned on, the line scan low-level signal VGL is input to the third electronic switch T3, the third electronic switch T3 is turned off, and the second end of the third electronic switch T3 is at a low level due to the coupling of the first capacitor C1. When the pull-down signal QB-n is at a high level, the seventh electronic switch T7 is turned on, and a low level is output by the seventh electronic switch T7, so that the first sub-line scan signal output from the second end of the third electronic switch T3 is pulled down and reset.

When the controlled end of the fourth electronic switch T4 is at a high level, the fourth electronic switch T4 is turned on, and a low level is input to the sixth electronic switch T6. When the line scan signal is at a low level, the fifth electronic switch T5 is turned off, the sixth electronic switch T6 is turned off, and a low level is output from the sixth electronic switch T6. When the line scan signal is at a high level, the line scan signal and the voltage of the controlled end of the fourth electronic switch T4 are partially overlap, the fourth electronic switch T4 and the fifth electronic switch T5 are turned on simultaneously. By adjusting the size of the device, the sixth electronic switch T6 remains in an off state. When the controlled end of the fourth electronic switch T4 is at a low level, the line scan signal continues to be at a high level, the sixth electronic switch T6 is turned on, and the line scan signal is output at a high level. When the line scan signal is switched to be at a low level, the fifth electronic switch T5 is turned off, and the second end of the sixth electronic switch T6 is at a low level due to the coupling of the second capacitor C2. When the pull-down signal QB-n is at a high level, the eighth electronic switch T8 is turned on, and a low level is output by the eighth electronic switch T8, so that the second sub-line scan signal output from the second end of the six-electronic switch T6 is pulled down and reset.

By arranging eight symmetrical electronic switches and the corresponding driving control signals, the splitting of the line scan signal is realized, the circuit structure is simple, the integrated arrangement of the GOA circuit 100 is convenient, and meanwhile, the size of the frame of the display panel is reduced, thereby achieving the narrow frame of the display panel.

Figure 8:
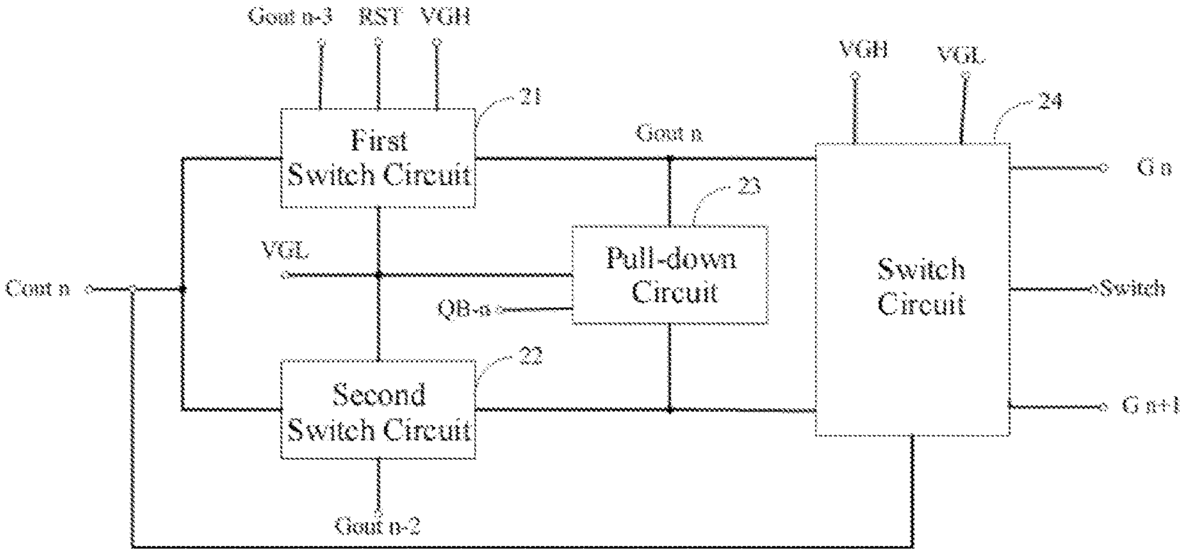
FIG. 8 is schematic diagram of a second structure of the signal split circuit in the GOA circuit shown in FIG. 4.

On the basis of the above signal split circuit 20, further optimization and implementation are provided as follows. To realize the driving diversity of the GOA drive circuit and to output different resolutions, as shown in FIG. 8, in an exemplary embodiment, the signal split circuit 20 also includes a switch circuit 24. A first signal input end of the switch circuit 24, the signal output end of the first switch circuit 21 and the first signal end of the pull-down circuit 23 are connected in common. A second signal input end of the switch circuit 24, the second signal output end of the switch circuit 22 and the second signal end of the pull-down circuit 23 are connected in common. A third signal input end of the switch circuit 24 is configured for inputting the line scan signal output from the GOA circuit unit 10 at the current stage. A first signal output end and a second signal output end of the switch circuit 24 serve as the first signal output end and the second signal output end of the signal split circuit 20 respectively, and a controlled end of the switch circuit 24 is configured for inputting a switch selection signal Switch, the line scan high-level signal VGH, and the line scan low-level signal VGL.

The switch circuit 24 is configured to be turned on and off according to the high or low level of the switch selection signal Switch, the line scan high-level signal VGH and the line scan low-level signal VGL, to enable the first sub-line scan signal and the second sub-line scan signal to be switched and output to the first signal output end and the second signal output end of the signal split circuit 20, or enable the line scan signal output from the GOA circuit unit 10 at the current stage to be output to the first signal output end and the second signal output end of the signal split circuit 20 respectively.

In this embodiment, as shown in FIG. 3 and FIG. 8, the external control signal further includes the switch selection signal Switch, and the switch selection signal Switch is input to the switch circuit 24 to switch and output the two can signals.

In an exemplary embodiment, when the switch selection signal Switch serves as a first level signal, the third signal input end of the switch circuit 24 is in connection with the first signal output end and the second signal output end, and when the line scan signal output from the GOA circuit unit 10 at the current stage is output to the first signal output end and the second signal output end of the split circuit 20 respectively, two adjacent rows of pixel units connected to respectively the two signal output ends are turned on simultaneously, and the same data signal is input, and then the resolution of the array substrate is reduced.

Figure 10:
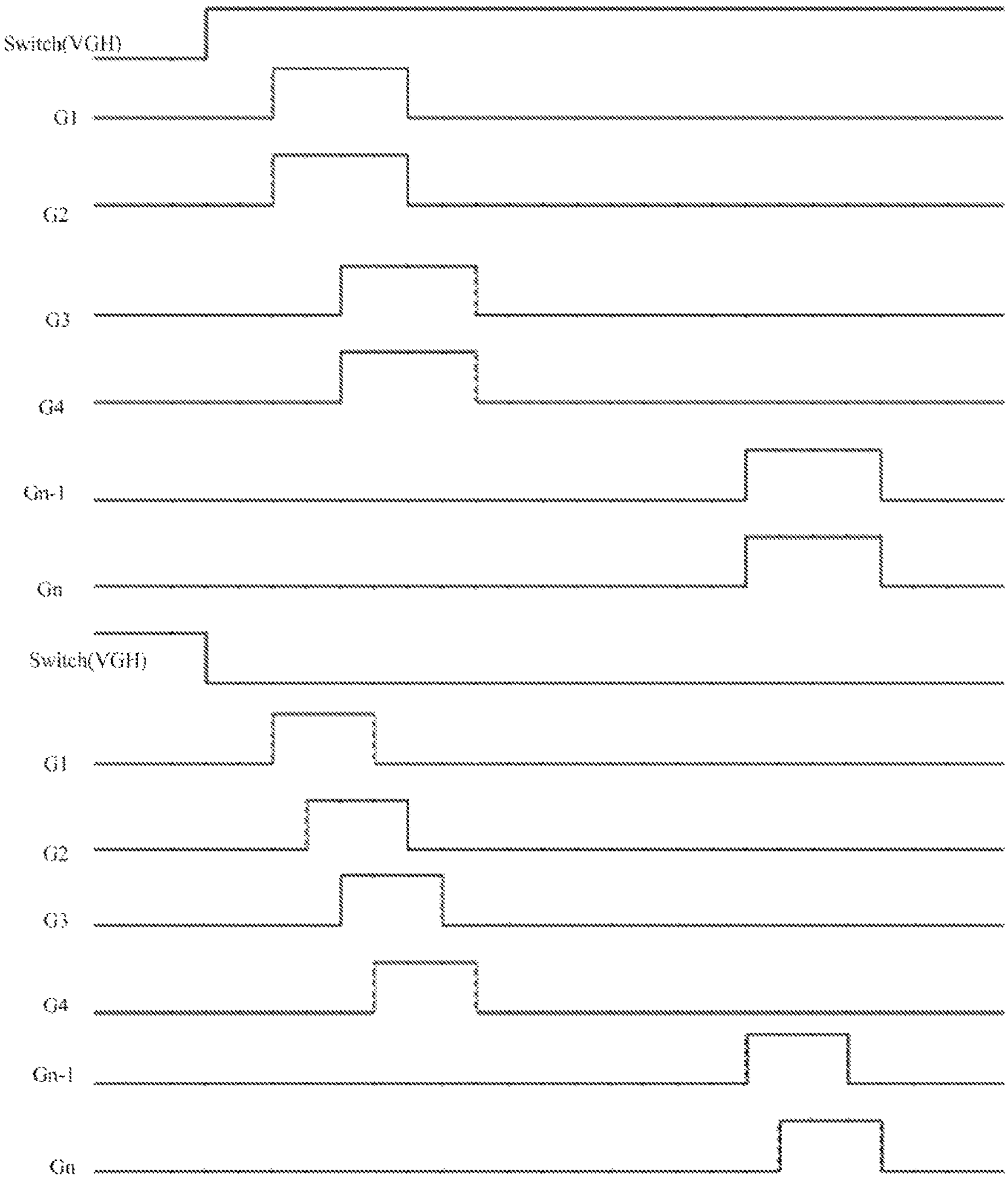
FIG. 10 is a second schematic waveform diagram of the signal split circuit in the GOA circuit shown in FIG. 9.

When the switch selection signal Switch serves as a second level signal having opposite polarity to the first level signal, the first signal input end of the switch circuit 24 is connected to the first signal output end of the switch circuit 24, and the second signal input end of the switch circuit 24 is connected the second signal output end of the switch circuit 24. The first sub-line scan signal and the second sub-line scan signal split and output by the first switch circuit 21, the second switch circuit 22 and the pull-down circuit 23 are respectively output to the first signal output end and the second signal output end of the signal split circuit 20, and two adjacent rows of pixel units are turned on row by row, as shown in FIG. 10, in one embodiment, the first level signal is at a high level, and the second level signal is at a low level.

The switch circuit 24 may be composed of different switching devices to realize the function of controlled switching of input and output, and the specific structure of the switch circuit 24 can be correspondingly arranged according to actual requirements.

Figure 9:
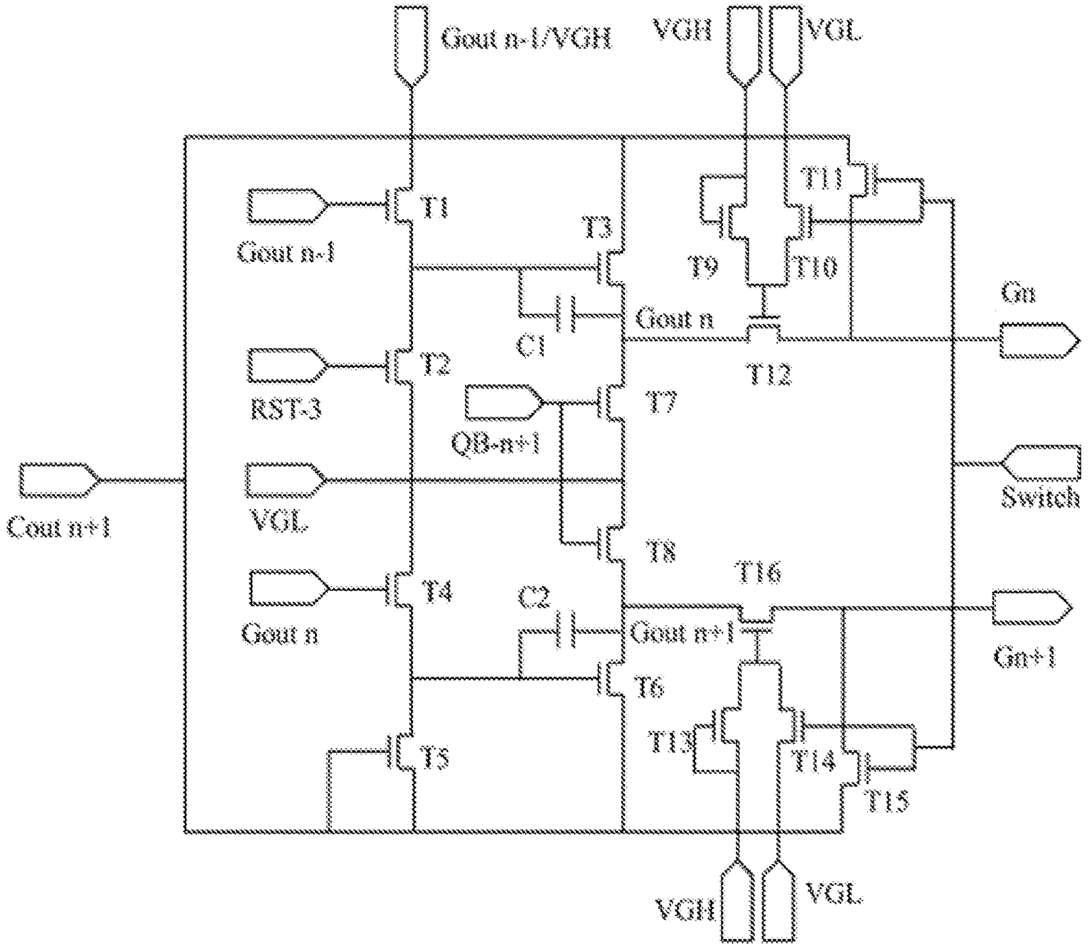
FIG. 9 is a second schematic circuit diagram of the signal split circuit in the GOA circuit shown in FIG. 8.

On the basis of the above signal split circuit 20, further optimization and implementation are provided as follows. As shown in FIG. 9, in an exemplary embodiment, the switch circuit 24 includes a ninth electronic switch T9, a tenth electronic switch T10, and an eleventh electronic switch T11, a twelfth electronic switch T12, a thirteenth electronic switch T13, a fourteenth electronic switch T14, a fifteenth electronic switch T15 and a sixteenth electronic switch T16.

A first end and a controlled end of the ninth electronic switch T9 are configured for inputting the line scan high-level signal VGH. A first end of the tenth electronic switch T10 is configured for inputting the line scan low-level signal VGL. A second end of the ninth electronic switch T9, a second end of the tenth electronic switch T10 and a controlled end of the twelfth electronic switch T12 are connected in common. A first end of the twelfth electronic switch T12 serves as the first signal input end of the switch circuit 24. A second end of the twelfth electronic switch T12 and a second end of the eleventh electronic switch T11 are connected in common to constitute the first signal output end of the switch circuit 24. A first end of the eleventh electronic switch T11 and a first end of the fifteenth electronic switch T15 are connected in common to constitute the third signal input end of the switch circuit 24. A controlled end of the eleventh electronic switch T11, a controlled end of the tenth electronic switch T10, a controlled end of the fifteenth electronic switch T15 and a controlled end of the fourteenth electronic switch T14 are connected in common and configured for inputting the switch selection signal Switch. A first end and the controlled end of the thirteenth electronic switch T13 are configured for inputting the line scan high-level signal VGH. A first end of the fourteenth electronic switch T14 is configured for inputting the line scan low-level signal VGL. A second end of the thirteenth electronic switch T13, a second end of the fourteenth electronic switch T14 and a controlled end of the sixteenth electronic switch T16 are connected in common. A first end of the sixteenth electronic switch T16 serves as the second signal input end of the switch circuit 24. A second end of the sixteenth electronic switch T16 and a second end of the fifteenth electronic switch T15 are connected in common to constitute the second signal output end of the switch circuit 24.

As shown in FIG. 9 and FIG. 10, when the switch selection signal Switch is at a high level, the tenth electronic switch T10 and the fourteenth electronic switch T14 are turned on respectively, to output a low level to the twelfth electronic switch T12 and the sixteenth electronic switch T16 respectively, and the twelfth electronic switch T12 and the sixteenth electronic switch T16 are turned off. When the tenth electronic switch T10 and the fourteenth electronic switch T14 are turned on respectively, meanwhile, the eleventh electronic switch T11 and the fifteenth electronic switch T15 are also turned on respectively, the line scan signal output from the GOA circuit unit 10 at the current stage is output to the first signal output end and the second signal output end of the signal split circuit 20 respectively, the two adjacent rows of pixel units connected thereto are turned on simultaneously, and the same data signal is input, and then the resolution of the array substrate is reduced.

When the switch selection signal Switch is at a low level, the tenth electronic switch T10, the eleventh electronic switch T11, the fourteenth electronic switch T14 and the fifteenth electronic switch T15 are turned off. The ninth electronic switch T9 and the thirteenth electronic switch T13 are turned on and a high level is input to the twelfth electronic switch T12 and the sixteenth electronic switch T16. The twelfth electronic switch T12 and the sixteenth electronic switch T16 are turned on. The first sub-line scan signal and the second sub-line scan signal split and output by the first switch circuit 21, the second switch circuit 22 and the pull-down circuit 23 are output to the first signal output end and the second signal output end of the signal split circuit 20, and then the two adjacent rows of pixel units are turned on row by row.

The present application also provides a display panel, which includes an array substrate and a GOA drive circuit. The specific structure of the GOA drive circuit may refer to the above-mentioned embodiments. The display panel includes all solutions of the above-mentioned embodiments, and thus at least all the beneficial effects brought by the solutions of the above embodiments are included by the display panel of the present application, which will not be repeated here. The GOA drive circuit is arranged on one side or two sides of the array substrate.

In this embodiment, the array substrate includes a display area and a non-display area. The non-display area is provided with a bonding pin area and a GOA drive circuit. The GOA drive circuit is arranged on one side or two sides of the non-display area of the array substrate for the progressive scan of the display area, and the progressive scan driving of the display area is realized in conjunction with the data signal.

The present application also provides a display device, which includes a backlight module, a drive circuit board and a display panel. The specific structure of the display panel may refer to the above-mentioned embodiments. The display device includes all solutions of all the above-mentioned embodiments, and thus at least all the beneficial effects brought by the solutions of the above embodiments are included by the display device of the present application, which will not be repeated here. The backlight module and the display panel are arranged opposite to each other, and the drive circuit board is electrical connection with the display panel.

In this embodiment, the backlight module is used to provide backlight. The drive circuit board is connected to the display panel through the chip on film. The external control signal is input to the driver chip in the chip on film, and the driver chip correspondingly converts the external control signal into a data signal and a control signal required for triggering the GOA drive circuit. The GOA drive circuit converts and outputs a shift pulse signal composed of multiple sub-line scan signals, and cooperates with the data signal to realize the progressive scan driving of the display area.

The above embodiments are intended only for illustration to the solutions of the present application rather than limitation. Although the present application is described in detail with reference to the above embodiments, it should be understood for those of ordinary skills in the art that the solutions described in the above embodiments may be modified, or some technical features in the above embodiments may be equivalently replaced. Those modifications or replacements do not make the essence of the corresponding solutions deviate from the spirit and scope of the solutions in the embodiments of the present application, and thus should all be included within the protection scope of the present application.

What is claimed is:

1. A gate-on-array (GOA) drive circuit, comprising:

multi-stage cascaded GOA circuits, each stage of the GOA circuits comprising:

a GOA circuit unit; and a signal split circuit, in connection with the GOA circuit unit, comprising a first signal output end and a second signal output end that are configured for connecting two adjacent scanning lines, wherein each stage of the signal split circuit, when triggered by multiple control signals, including a first sub-line scan signal and a second sub-line scan signal output from the signal split circuit at a fore-stage and/or an external control signal, is configured to split line scan signal output from the GOA circuit unit at a current stage into the first sub-line scan signal and the second sub-line scan signal and output the same to the first signal output end, the second signal output end and the signal split circuit at a post-stage; and wherein a rising edge of the first sub-line scan signal output from the signal split circuit at each stage is triggered simultaneously with a rising edge of the line scan signal output from the GOA circuit unit at each stage, and a falling edge of the second sub-line scan signal output from the signal split circuit at each stage is triggered simultaneously with a falling edge of the line scan signal output from the GOA circuit unit at each stage, and high level durations of the first sub-line scan signal and the second sub-line scan signal output from the signal split circuit at each stage are partially overlapped.

2. The GOA drive circuit of claim 1, wherein the external control signal comprises a multi-channel clock signal, a frame start signal, a line scan high-level signal, a line scan low-level signal, a first pulse reset signal, and a second pulse reset signal;

the first pulse reset signal is input to the signal split circuit at a j-th stage, and the second pulse reset signal is input to the signal split circuit at a (j+1)-th stage, wherein, j=1, 3, . . . , n−1;

the falling edge of the first sub-line scan signal of the signal split circuit at the j-th stage is triggered simultaneously with the rising edge of the first pulse reset signal, and the falling edge of the first sub-line scan signal of the signal split circuit at the (j+1)-th stage is triggered simultaneously with the rising edge of the second pulse reset signal;

a first stage of the signal split circuit, when triggered by the frame start signal, the line scan high-level signal, the line scan low-level signal, the first pulse reset signal and a pull-down signal output from the GOA circuit unit at the current stage, is configured to split the line scan signal of the GOA circuit unit at the current stage into the first sub-line scan signal and the second sub-line scan signal and output the same;

a second stage of the signal split circuit, when triggered by the frame start signal, the line scan high-level signal, the line scan low-level signal, the second pulse reset signal, the pull-down signal output from the GOA circuit unit at the current stage and the first sub-line scan signal output from the signal split circuit at the first stage, is configured to split the line scan signal of the GOA circuit unit at the current stage into the first sub-line scan signal and the second sub-line scan signal and output the same; and an i-th stage of the signal split circuit, when triggered by the line scan high-level signal, the line scan low-level signal, a corresponding pulse reset signal, the pull-down signal output from the GOA circuit unit at the current stage, the second sub-line scan signal output from the signal split circuit at a (i−2)-th stage, and the first sub-line scan signal output from the signal split circuit at a (i−1)-th stage, is configured to split the line scan signal of the GOA circuit unit at the current stage into the first sub-line scan signal and the second sub-line scan signal and output the same, wherein i≥3, i is an integer.

3. The GOA drive circuit of claim 2, wherein each stage of the signal split circuit comprises a first switch circuit, a second switch circuit, and a pull-down circuit;

a signal output end of the first switch circuit and a first signal end of the pull-down circuit are connected in common to constitute the first signal output end of the signal split circuit, a signal output end of the second switch circuit and a second signal end of the pull-down circuit are connected in common to constitute the second signal output end of the signal split circuit, the first switch circuit and the second switch circuit are further connected with a signal output end of the GOA circuit unit at the current stage respectively, and a controlled end of the pull-down circuit is connected to a pull-down point of the GOA circuit unit at the current stage, and is configured for inputting a pull-down signal;

the first switch circuit is configured to be turned on and off correspondingly at corresponding timings according to a combination of levels of multiple signals including the corresponding pulse reset signal, the second sub-line scan signal output from the signal split circuit at the fore-stage, the line scan high-level signal, the line scan low-level signal and the frame start signal, to output the first sub-line scan signal of the signal split circuit at the current stage;

the second switch circuit is configured to be turned on and off correspondingly at corresponding timings according to a combination of levels of multiple signals including the first sub-line scan signal output from the signal split circuit at the fore-stage, the line scan low-level signal and the frame start signal, to output the second sub-line scan signal of the signal split circuit at the current stage; and the pull-down circuit is configured to be turned on and off correspondingly at corresponding timings according to a combination of levels of the line scan low-level signal and the pull-down signal, to enable the first sub-line scan signal and the second sub-line scan signal to be pulled down and reset.

4. The GOA drive circuit of claim 3, wherein the first switch circuit comprises a first signal input end configured for inputting the second sub-line scan signal output from the signal split circuit at the fore-stage, a second signal input end for inputting the pulse reset signal, a third signal input end configured for inputting the line scan high-level signal, a fourth signal input end configured for inputting the line scan low-level signal, and a fifth signal input end configured in connection with a signal output end of the GOA circuit unit at the current stage;

the second switch circuit comprises a first signal input end configured for inputting the first sub-line scan signal output from the signal split circuit at the fore-stage, a second signal input end configured for inputting the line scan low-level signal, and a third signal input end configured in connection with a signal output end of the GOA circuit unit at the current stage; and the pull-down circuit comprises a first signal input end configured for inputting the line scan low-level signal and a second signal input end configured in connection with a pull-down point of the GOA circuit unit at the current stage.

5. The GOA drive circuit of claim 3, wherein the first switch circuit comprises a first electronic switch, a second electronic switch, a third electronic switch, and a first capacitor;

a first end of the first electronic switch is configured for inputting one of the frame start signal, the second sub-line scan signal output from the signal split circuit at the fore-stage, and the line scan high-level signal, a controlled end of the first electronic switch is configured for inputting the frame start signal or the second sub-line scan signal output from the signal split circuit at the fore-stage, a second end of the first electronic switch, a first end of the second electronic switch, a controlled end of the third electronic switch and a first end of the first capacitor are connected in common, a second end of the second electronic switch is configured for inputting the line scan low-level signal, a controlled end of the second electronic switch is configured for inputting the corresponding pulse reset signal, a first end of the third electronic switch is configured for inputting the line scan signal output from the GOA unit, and a second end of the third electronic switch and a second end of the first capacitor are connected in common to constitute the signal output end of the first switch circuit.

6. The GOA drive circuit of claim 5, wherein the second switch circuit comprises a fourth electronic switch, a fifth electronic switch, a sixth electronic switch, and a second capacitor;

a first end of the fourth electronic switch is configured for inputting the line scan low-level signal, a second end of the fourth electronic switch, a first end of the fifth electronic switch, a controlled end of the six-electronic switch and a first end of the second capacitor are connected in common, a second end of the fifth electronic switch, a controlled end of the fifth electronic switch and a first end of the sixth electronic switch are connected in common and configured for inputting the line scan signal output from the GOA circuit unit at the current stage, a controlled end of the fourth electronic switch is configured for inputting the frame start signal or the first sub-line scan signal output from the signal split circuit at the fore-stage, and a second end of the sixth electronic switch and a second end of the second capacitor are connected in common to constitute the signal output end of the second switch circuit.

7. The GOA drive circuit of claim 6, wherein the pull-down circuit comprises a seventh electronic switch and an eighth electronic switch;

a first end of the seventh electronic switch serves as the first signal end of the pull-down circuit, a first end of the eighth electronic switch serves as the second signal end of the pull-down circuit, a controlled end of the seventh electronic switch and a controlled end of the eighth electronic switch are connected in common and configured for inputting the pull-down signal, and a second end of the seventh electronic switch and a second end of the eighth electronic switch are connected in common.

8. The GOA drive circuit of claim 3, wherein the signal split circuit further comprises a switch circuit, a first signal input end of the switch circuit, the signal output end of the first switch circuit, and the first signal end of the pull-down circuit are connected in common, a second signal input end of the switch circuit, the signal output end of the second switch circuit, and the second signal end of the pull-down circuit are connected in common, a third signal input end of the switch circuit is configured for inputting the line scan signal output from the GOA circuit unit at the current stage, a first signal output end and a second signal output end of the switch circuit serve as the first signal output end and the second signal output end of the signal split circuit, and a controlled end of the switch circuit is configured for inputting a switch selection signal, the line scan high-level signal and the line scan low-level signal;

wherein the switch circuit is configured to be turned on and off according to high and low levels of the switch selection signal, the line scan high-level signal and the line scan low-level signal, to enable the first sub-line scan signal and the second sub-line scan signal to be switched and output to the first signal output end and the second signal output end of the signal split circuit, or to enable the line scan signal output from the GOA circuit unit at the current stage to be output to the first signal output end and the second signal output end of the signal split circuit, respectively.

9. The GOA drive circuit of claim 8, wherein the third signal input end of the switch circuit is in connection with the first signal output end and the second signal output end when the switch selection signal is at a high level; and wherein the first signal input end of the switch circuit is connected to the first signal output end of the switch circuit, and the second signal input end of the switch circuit is connected to the second signal output end of the switch circuit, when the switch selection signal is at a low level.

10. The GOA drive circuit of claim 8, wherein the switch circuit comprises a ninth electronic switch, a tenth electronic switch, an eleventh electronic switch, a twelfth electronic switch, a thirteenth electronic switch, a fourteenth electronic switch, a fifteenth electronic switch, and a sixteenth electronic switch;

a first end and a controlled end of the ninth electronic switch are configured for inputting the line scan high-level signal, a first end of the tenth electronic switch is configured for inputting the line scan low-level signal, a second end of the ninth electronic switch, a second end of the tenth electronic switch, and a controlled end of the twelfth electronic switch are connected in common, a first end of the twelfth electronic switch serves as the first signal input end of the switch circuit, a second end of the twelfth electronic switch and a second end of the eleventh electronic switch are connected in common to constitute the first signal output end of the switch circuit, a first end of the eleventh electronic switch and a first end of the fifteenth electronic switch are connected in common to constitute the third signal input end of the switch circuit, a controlled end of the eleventh electronic switch, a controlled end of the tenth electronic switch, a controlled end of the fifteenth electronic switch, and a controlled end of the fourteenth electronic switch are connected in common and configured for inputting the switch selection signal, a first end and a controlled end of the thirteenth electronic switch are configured for inputting the line scan high-level signal, a first end of the fourteenth electronic switch is configured for inputting the line scan low-level signal, a second end of the thirteenth electronic switch, a second end of the fourteenth electronic switch and a controlled end of the sixteenth electronic switch are connected in common, a first end of the sixteenth electronic switch serves as the second signal input end of the switch circuit, and a second end of the sixteenth electronic switch and a second end of the fifteenth electronic switch are connected in common to constitute the second signal output end of the switch circuit.

11. The GOA drive circuit of claim 1, wherein the GOA circuit unit and the signal split circuit are integrated to be constituted as a GOA chip.

12. The GOA drive circuit of claim 11, wherein the GOA chip comprises a clock signal pin for receiving a clock signal, a line scan high-level signal pin for receiving a line scan high-level signal, a line scan low-level signal pin for receiving a line scan low-level signal, a first signal input pin for receiving an input signal, a second signal input pin for receiving the second sub-line scan signal output from the signal split circuit at the fore-stage, a third signal input pin for receiving the first sub-line scan signal output from the signal slit circuit at the fore-stage, a fourth signal input pin for receiving the line scan signal output from the GOA chip at the post-stage, a reset pulse signal pin for receiving a corresponding reset pulse signal, a first signal output pin for outputting the line scan signal of the GOA chip at the current stage, a second signal output pin for outputting the first sub-line scan signal of the signal slit circuit at the current stage, and a third signal output pin for outputting the second sub-line scan signal of the signal slit circuit at the current stage.

13. A display panel, comprising:

an array substrate; and a GOA drive circuit, disposed on one side or two sides of the array substrate, and comprising:

multi-stage cascaded GOA circuits, and each stage of the GOA circuits comprises:

a GOA circuit unit; and a signal split circuit, in connection with the GOA circuit unit, comprising a first signal output end and a second signal output end that are configured for connecting two adjacent scanning lines, wherein each stage of the signal split circuit, when triggered by multiple control signals including a first sub-line scan signal and a second sub-line scan signal output from the signal split circuit at a fore-stage and/or an external control signal, is configured to split line scan signal output from the GOA circuit unit at a current stage into the first sub-line scan signal and the second sub-line scan signal and output the same to the first signal output end, the second signal output end and the signal split circuit at a post-stage; and wherein a rising edge of the first sub-line scan signal output from the signal split circuit at each stage is triggered simultaneously with a rising edge of the line scan signal output from the GOA circuit unit at each stage, and a falling edge of the second sub-line scan signal output from the signal split circuit at each stage is triggered simultaneously with a falling edge of the line scan signal output from the GOA circuit unit at each stage, and high level durations of the first sub-line scan signal and the second sub-line scan signal output from the signal split circuit at each stage are partially overlapped.

14. The display panel of claim 13, wherein the array substrate comprises a display area and a non-display area, the non-display area is provided with a bonding pin area and the GOA drive circuit, and wherein the GOA drive circuit is arranged on one side or two sides of the non-display area of the array substrate.

15. The display panel of claim 13, wherein the external control signal comprises a multi-channel clock signal, a frame start signal, a line scan high-level signal, a line scan low-level signal, a first pulse reset signal, and a second pulse reset signal;

the first pulse reset signal is input to the signal split circuit at a j-th stage, and the second pulse reset signal is input to the signal split circuit at a (j+1)-th stage, wherein, j=1, 3, . . . , n−1;

the falling edge of the first sub-line scan signal of the signal split circuit at the j-th stage is triggered simultaneously with the rising edge of the first pulse reset signal, and the falling edge of the first sub-line scan signal of the signal split circuit at the (j+1)-th stage is triggered simultaneously with the rising edge of the second pulse reset signal;

a first stage of the signal split circuit, when triggered by the frame start signal, the line scan high-level signal, the line scan low-level signal, the first pulse reset signal and a pull-down signal output from the GOA circuit unit at the current stage, is configured to split the line scan signal of the GOA circuit unit at the current stage into the first sub-line scan signal and the second sub-line scan signal and output the same;

a second stage of the signal split circuit, when triggered by the frame start signal, the line scan high-level signal, the line scan low-level signal, the second pulse reset signal, the pull-down signal output from the GOA circuit unit at the current stage and the first sub-line scan signal output from the signal split circuit at the first stage, is configured to split the line scan signal of the GOA circuit unit at the current stage into the first sub-line scan signal and the second sub-line scan signal and output the same; and an i-th stage of the signal split circuit, when triggered by the line scan high-level signal, the line scan low-level signal, a corresponding pulse reset signal, the pull-down signal output from the GOA circuit unit at the current stage, the second sub-line scan signal output from the signal split circuit at a (i−2)-th stage, and the first sub-line scan signal output from the signal split circuit at a (i−1)-th stage, is configured to split the line scan signal of the GOA circuit unit at the current stage into the first sub-line scan signal and the second sub-line scan signal and output the same, wherein i≥3, i is an integer.

16. The display panel of claim 15, wherein the signal split circuit at each stage comprises a first switch circuit, a second switch circuit, and a pull-down circuit;

a signal output end of the first switch circuit and a first signal end of the pull-down circuit are connected in common to constitute the first signal output end of the signal split circuit, a signal output end of the second switch circuit and a second signal end of the pull-down circuit are connected in common to constitute the second signal output end of the signal split circuit, the first switch circuit and the second switch circuit are further connected with a signal output end of the GOA circuit unit at the current stage respectively, and a controlled end of the pull-down circuit is connected to a pull-down point of the GOA circuit unit at the current stage, and is configured for inputting a pull-down signal;

the first switch circuit is configured to be turned on and off correspondingly at corresponding timings according to a combination of levels of multiple signals including the corresponding pulse reset signal, the second sub-line scan signal output from the signal split circuit at the fore-stage, the line scan high-level signal, the line scan low-level signal and the frame start signal, to output the first sub-line scan signal of the signal split circuit at the current stage;

the second switch circuit is configured to be turned on and off correspondingly at corresponding timings according to a combination of levels of multiple signals including the first sub-line scan signal output from the signal split circuit at the fore-stage, the line scan low-level signal and the frame start signal, to output the second sub-line scan signal of the signal split circuit at the current stage; and the pull-down circuit is configured to be turned on and off correspondingly at corresponding timings according to a combination of levels of the line scan low-level signal and the pull-down signal, to enable the first sub-line scan signal and the second sub-line scan signal to be pulled down and reset.

17. The display panel of claim 16, wherein the first switch circuit comprises a first signal input end configured for inputting the second sub-line scan signal output from the signal split circuit at the fore-stage, a second signal input end for inputting the pulse reset signal, a third signal input end configured for inputting the line scan high-level signal, a fourth signal input end configured for inputting the line scan low-level signal, and a fifth signal input end configured in connection with a signal output end of the GOA circuit unit at the current stage;

the second switch circuit comprises a first signal input end configured for inputting the first sub-line scan signal output from the signal split circuit at the fore-stage, a second signal input end configured for inputting the line scan low-level signal, and a third signal input end configured in connection with a signal output end of the GOA circuit unit at the current stage; and the pull-down circuit comprises a first signal input end configured for inputting the line scan low-level signal and a second signal input end configured in connection with a pull-down point of the GOA circuit unit at the current stage.

18. The display panel of claim 13, wherein the GOA circuit unit and the signal split circuit are integrated to be constituted as a GOA chip.

19. The display panel of claim 18, wherein the GOA chip comprises a clock signal pin for receiving a clock signal, a line scan high-level signal pin for receiving a line scan high-level signal, a line scan low-level signal pin for receiving a line scan low-level signal, a first signal input pin for receiving an input signal, a second signal input pin for receiving the second sub-line scan signal output from the signal split circuit at the fore-stage, a third signal input pin for receiving the first sub-line scan signal output from the signal slit circuit at the fore-stage, a fourth signal input pin for receiving the line scan signal output from the GOA chip at the post-stage, a reset pulse signal pin for receiving a corresponding reset pulse signal, a first signal output pin for outputting the line scan signal of the GOA chip at the current stage, a second signal output pin for outputting the first sub-line scan signal of the signal slit circuit at the current stage, and a third signal output pin for outputting the second sub-line scan signal of the signal slit circuit at the current stage.

20. A display device, comprising:

a display panel, comprising:

an array substrate; and a GOA drive circuit, disposed on one side or two sides of the array substrate, and comprising:

multi-stage cascaded GOA circuits, and each stage of the GOA circuits comprises:

a GOA circuit unit; and a signal split circuit, in connection with the GOA circuit unit, and comprising a first signal output end and a second signal output end that are configured for connecting two adjacent scanning lines, wherein each stage of the signal split circuit, when triggered by multiple control signals including a first sub-line scan signal and a second sub-line scan signal output from the signal split circuit at a fore-stage and/or an external control signal, is configured to split line scan signal output from the GOA circuit unit at a current stage into the first sub-line scan signal and the second sub-line scan signal and output the same to the first signal output end, the second signal output end and the signal split circuit at a post-stage; and wherein a rising edge of the first sub-line scan signal output from the signal split circuit at each stage is triggered simultaneously with a rising edge of the line scan signal output from the GOA circuit unit at each stage, and a falling edge of the second sub-line scan signal output from the signal split circuit at each stage is triggered simultaneously with a falling edge of the line scan signal output from the GOA circuit unit at each stage, and high level durations of the first sub-line scan signal and the second sub-line scan signal output from the signal split circuit at each stage are partially overlapped;

a backlight module, arranged opposite to the display panel; and a drive circuit board, arranged in electrical connection with the display panel.

* * * * *